United States Patent [19]

Ohno et al.

[11] 4,364,637

[45] Dec. 21, 1982

[54] HIGHLY REFLECTIVE PLASTIC REFLECTOR WITH CRYSTALLINE INORGANIC FILM COATING

[75] Inventors: Akira Ohno; Shitomi Katayama; Susumu Senaha; Suizo Kyo; Akira Akagami, all of Yokohama, Japan

[73] Assignees: NHK Spring Co., Ltd.; Yokohama Kiko Co., Ltd., both of Kanagawa, Japan

[21] Appl. No.: 48,312

[22] Filed: Jun. 13, 1979

[30] Foreign Application Priority Data

Jun. 13, 1978 [JP] Japan .................................. 53-70399
Jun. 13, 1978 [JP] Japan .................................. 53-70400

[51] Int. Cl.$^3$ .......................... G02B 1/10; G02B 5/08; B05D 302
[52] U.S. Cl. .................................. 350/288; 427/162; 427/294; 427/248.1
[58] Field of Search ....................... 350/288, 299, 303; 427/162, 294, 248 J, 250, 296, 164; 260/37 PC, 39, 39 SB; 428/433

[56] References Cited

U.S. PATENT DOCUMENTS

| | | | |
|---|---|---|---|
| B520,878 | 4/1976 | Horn et al. | 260/37 PC |
| 2,386,876 | 10/1945 | Ogle et al. | 427/164 |
| 2,920,002 | 11/1960 | Auwarter | 427/162 |
| 3,450,465 | 6/1969 | Prance et al. | 350/288 |
| 3,501,227 | 3/1970 | Landen | 350/303 |
| 3,607,457 | 9/1971 | Hagg et al. | 427/162 |
| 3,687,713 | 8/1972 | Adams | 350/288 |
| 3,876,580 | 4/1975 | Nouvertne et al. | 260/37 PC |
| 4,056,649 | 11/1977 | Walls et al. | 427/164 |
| 4,093,350 | 6/1978 | Fisli | 350/299 |
| 4,101,365 | 7/1978 | Fisli | 350/288 |
| 4,242,254 | 12/1980 | Abolins | 260/39 R |

FOREIGN PATENT DOCUMENTS

| | | | |
|---|---|---|---|
| 6917335 | 7/1969 | Netherlands | 427/162 |
| 1024347 | 3/1966 | United Kingdom | 350/288 |
| 1066839 | 4/1967 | United Kingdom | 350/288 |

*Primary Examiner*—Jon W. Henry
*Attorney, Agent, or Firm*—Sughrue, Mion, Zinn, Macpeak & Seas

[57] ABSTRACT

The present invention relates to a plastic reflector having high reflective properties and the method of preparing the same. The reflector is obtained by disposing a reflective film in which a light-reflective metal is coated by a vacuum coating method on one or all sides of a molded body made of polymeric materials or the derivative thereof and further by disposing a light-transmissible coated film in which an inorganic substance selected from metallic oxides and oxides of amphoteric elements or a derivative thereof is vacuum coated on the reflective film.

6 Claims, No Drawings

HIGHLY REFLECTIVE PLASTIC REFLECTOR WITH CRYSTALLINE INORGANIC FILM COATING

FIELD OF THE INVENTION

The present invention relates to reflectors having various uses such as illuminating shades, various types of optical apparatuses and instruments, sunlight reflectors, etc. and the method of the preparation thereof.

BACKGROUND OF INVENTION

Conventional reflectors and the methods of the preparation thereof can be classified as follows: Typical examples are (1) those in which the surfaces of metals such as stainless steel or aluminum are buff-polished, electrolytically polished or chemically polished, (2) those in which the surfaces of metals such as iron or aluminum are porcelain enameled, (3) those in which glass plates or transparent resin plates are coated metals such as aluminum by vacuum deposition or silver by silver mirror reaction on the surfaces or back sides thereof and (4) those in which transparent resin films are coated on the surfaces of (1) or (3) as above mentioned.

Those in (1), however, are made of metals, so that poor manufacturing flexibility arises corrosion occurs and, further more, polishing needs a great deal of labor. Additionally, on mechanical polishing such as buff-polishing, the finished surfaces are rough and the single metal surfaces are very difficult to produce light reflective properties. Electrolytic or chemical polishings, which are wet methods, have the disadvantage that not only do pollution problems of the chemicals used occur but also the light reflective properties on the polished surfaces are not good but are insufficient as mirror surfaces.

Those in (2) made of metals have disadvantages. Those in (1) and the porcelain-enameled surfaces do not have light reflectivity but diffused reflection and dispersed light are obtained, although the surfaces are smooth. Moreover, procelain enamels are fragile and thus not resistant to impact, and corrosion and erosion of metals occurs in the broken area. Since porcelain enamels have high specific gravities, they have many disadvantages such as heavy weight.

As to those in (3), the surfaces are of metals, and consequently, chemical their resistance, weatherability and abrasion resistance are bad and particularly those of glass are not only heavy and easily break, but also have poor total reflectivity. In the case of those electroplated with nickel or chromium, though they have good light reflectivity since conventional electroplating is a wet process, this process has the disadvantage of the environmental pollution problem in terms of the chemicals used.

Those in (4) are improved as to the disadvantage of (1) to (3) but heat resistance, abrasion resistance, light resistance, weatherability, chemical resistance, etc. of the protective resin films coated on the surfaces are trouble some problems. For example, the surfaces tend to be colored or devitrified, and the total reflectivity decreases or when the surfaces are wiped with a cloth, etc., to clean them, abrasion is often observed as as time passes. And since the protective resin films on the surfaces are formed by coating resin solutions and allowing the solvents to vaporize and solidify the resin films in production environmental pollution due to solvents occurs and, not only is an device for recovering solvents required but also, when the substrate resins, glass, etc., when the surfaces are not smooth but rough and have patterns, the coating is very difficult. For example, even if coating could be done, due to the sagging phenomenon of resin solutions and the filling of gaps of the non-smooth surfaces of the coating films with resin, not only total reflectivity but also light reflectivity detoriates very much due to the heterogeneous refraction or absorption of light due to the coated resin layers. Further, since the coating thickness of the coating is larger, those in (4) have many disadvantages. One of these disadvantages is that not only is absorption index of light is high but also the absorption of IR rays becomes high, and thus, the surface temperature rises and the above mentioned deterioration of the physical properties of the resin layers on the surfaces is accelerated.

SUMMARY OF THE INVENTION

The present invention is intended to remove these conventional disadvantages.

The first object is to provide reflectors which are light weight and have the desired shape, color, smoothness and patterns of the reflecting surfaces and are easily obtainable and in which light distribution, total reflectivity and the color and wavelength distribution of reflected light can easily be changed.

The second object is to provide reflectors whose surfaces are oil-resistant and abrasion-resistant and where little devitrification and coloring deterioration with time are observed, and further where the total reflectivity, light reflectivity and refractive index undergo little change.

The third object is to provide the method of preparing reflectors whose manufacture is easy and carried out with little polluting waste matter being produced.

The reflector of the present invention comprises layer structures characterized in that a light-reflective metallic film is coated on one or all sides of a resin molded body and further on the surface of the reflective film is coated a light-transmissible film consisting of inorganic substances such as metallic oxides and oxides of amphoteric elements or derivatives thereof. The present invention also relates to a method of preparing a reflector characterized in that the body of the reflector is formed of a polymeric material or a composite thereof and on one or all sides of the body light-reflective metals such as pure metals, alloys or metallic compounds are vacuum coated and then further on the light-reflective surfaces are vacuum coated light-transmissible films comprising inorganic substances such as metallic oxides and oxides of amphoteric elements or derivatives thereof.

DETAILED DESCRIPTION OF THE INVENTION

The substrates may be resin molded bodies and the shape may be any shape, such as conical, cylindrical or of any other form, and may be single resin molded bodies or composite resin molded bodies.

As polymeric materials in the present invention, both thermoplastic resins such as, polyphenylene sulfide, polyacrylonitrile and polyvinyl carbazole; and thermosetting resins such as polycarbonate resin, polyester resin, phenol resin, urea resin, furfural resin, allyl resin, epoxy resin, silicon resin, borosilicone resin and a carbosilicon resin can be used. The above examples are not limitative. These resins may be filled with reinforcing fillers such as glass fibers, mica and asbestos or may be imparted with flame retardant properties or self fire-extinguishing properties. However, substances which are volatile substances, evaporate under vacuum and thereby raise the vapor pressure, such as volatile plasticizers and dyestuffs should not be present.

Thermoplastic resins can be molded by conventional methods such as extrusion molding, injection molding, stamping molding, compression molding and vacuum molding and thermosetting resins can be molded by methods such as injection molding, cast molding and compression molding for example.

On one or all sides of the molded bodies obtained or composites thereof are coated light-reflective metals by the vacuum coating method. Among light-reflective metals colorless metals, can be selected from pure metals such as aluminum, silver, chromium, nickel, platinum, etc. and the alloys thereof; and typical examples of colored metals or metallic compounds are pure metals such as copper, gold, and alloys and compounds such as brass, titanium nitride, though these examples are not limitative.

To subject these metals, alloys and metallic compounds to vacuum coating, it is necessary to conduct the coating below the thermal decomposition temperature and the thermal distortion temperature of the resin body. Special care must be taken to remove initially as much possible lower molecular weight substances such as unreacted monomers, volatile plasticizers solvents and water, which vaporize under vacuum and thereby raise the vapor pressure if there are any of these materials in the resins.

Since vacuum coating of metals can be carried out in a comparatively short time, usually from a few seconds to several minutes, the temperature rise of the resin due to the coating is low. The thicknesses of the coated metals, alloys or metallic compounds should be sufficient to fully reflect visible light, near infrared rays, and ultraviolet rays though the thickness will vary according to the kinds of metal. Usually, several thousand Angstroms or above and at the thickest one micron will be sufficient. But this does not apply to some cases depending upon the purpose, for example, semi-translucent mirrors for visible light or cold mirrors which reflect visible light but pass infrared rays.

As metals having the best light-reflectivities, silver and aluminum are typical, but from an economical viewpoint, the latter is desirable.

On the thus formed films of metals, alloys or metallic compounds manufactured in this way, a light-transmissible film of inorganic substances such as metallic oxides and oxides of amphoteric elements or derivatives thereof are coated by vacuum coating methods such as vacuum deposition, sputtering and ion plating.

Such compounds can be selected from inorganic oxides, glass and ceramics capable of forming films which are light transmissible consisting of inorganic substances. Examples include silicon derivatives such as silicon dioxide, and quartz; ceramics of metallic oxides such as magnesia, alumina, zirconia and spinel; ceramics of cordierite; lithia ceramics such as Pyroceram; silicate glass such as barium glass, borosilica glass and alumina silica glass; borate glass such as alumina borate glass; and phosphate glass such as alumina phosphate glass, though they are not limitative.

It is desirable that the coated films of the inorganic substances be usually from several thousand Angstroms to 4 microns thick and to apply an ion plating method when high film strength of the above metal film surfaces and inorganic films are required for protection, under a vacuum of $10^{-1}$ to $10^{-4}$ Torr and preferably $10^{-2}$ to $10^{-3}$ Torr, a DC voltage of 100 V to 10 kV had better be applied to the substrate cathode.

It is possible to vacuum coat the inorganic substances successively onto the precoated metal films without taking the substrates out of the vacuum. In general, these inorganic compounds have higher melting points as compared with metals and larger evaporation or sublimation energies, and hence, due to the temperature rise, deformation, melting or decomposition of the resins sometimes take place. For example, in sputtering of silicon dioxide, the coating velocity is far slower as compared with that with other methods, but if the excitation output power should be increased too much to increase the coating velocity, a deformation of the resins often occur. It is desirable to carry out the coating at a velocity below 100 A/min at the highest and preferably below 50 A/min. When a vacuum deposition method is employed, the temperature rise is small and a velocity in vacuum deposition of 1000 to 4000 A/min is possible. But by cooling the substrate initially with water, a higher coating velocity become possible.

The thus obtained light reflector can be used as prepared, but to increase durability, it is better to allow the reflectors to age, e.g., by: (1) allowing the reflector to stand at room temperature several days, (2) heating the reflector below the heat distortion temperature for several tens of minutes, (3) repeating a heating and cooling of the reflector several times below the heat distortion temperature, (4) heating the reflector with thermally hot lamps. When these agings are not performed, the surface protective films or metal films, etc., sometimes happen to peel off or erode if the reflectors should be wet with water or chemicals.

The reflectors of the present invention have the following advantages:

(1) since the reflector bodies are made of resins, they are light weight, labor required for manufacture is less, various desired shapes can be easily formed on molding, and by melt dyeing of the resins, various colors can be obtained as desired or postcoloration, such as afterprinting, is possible, (2) resin reflectors with anticorrosion properties do not need after-coating for anticorrosion, unlike those made of metals, (3) the shapes of the reflectors and smoothness or pattern of the reflective surfaces can be easily changed as desired, and the kinds of light-reflective metals can be variously chosen; and consequently, light distribution, total reflectivity, light reflectivity, color or wavelength of reflected light can be achieved in accordance with the desired conditions, and functionalities suitable for the purpose of use can be effectively developed, (4) since the light-transmissible films of inorganic substances on the reflector surfaces are formed by vacuum coating, which is different from conventional methods of using resin coats, this method can be used to form thin films of the same replicas as the light-transmissible metal film bases on the substrates, and thus, refraction or absorption of light due to the protective films is very slight, and total reflectivity, light reflectivity and refractive index vary little. Moreover, deterioration of transparency by coloring with time, as observed in conventional protective resin films are rare, (5) protective films of inorganic substances surpass protective resin films in oil resistance and abrasion resistance and are not corroded by oil pollution inspite of the long use and yet little abrasion due to the wiping off oil and dust occurs, providing long useful life, (6) since protective films of inorganic substances can be formed as thin films and have larger thermal conductivities as compared with protective resin films, the temperature rise of the present films is lower when used as reflectors and lighting shades, (7) in the manufacturing processes, toxic substances are not used because of the dry processing involved and pollution substances are rarely generated. Thus the manufacture can be safely carried out and in an economical manner and the degree of freedom in the location of a factories is also appreciable, (8) since after the vacuum coating of the light-reflective metal is carried out, the vacuum coating of a light-transmissible film of inorganic substances, such as inorganic dioxides, oxides of amphoteric elements and derivatives thereof can successively be carried out, the process is simple, and (9) since light-transmissible protective films of inorganic substances are vacuum coated, the resulting thin films have the same form as the light-reflective metal film bases, refraction or absorption of light due to the protective films is very little, and changes of total reflectivity, light reflectivity and refractive index are small and in addition, deterioration of transparency or of coloring with time is very rare, which is different from protective resin films.

The reflectors of the present invention have excellent advantages, eliminating the disadvantages of conventional reflectors.

EXAMPLE 1

Self fire-extinguishing polycarbonate was extrusion molded to form a plate of 2 mm thickness, 0.1 micron or less in surface roughness and $30 \times 30$ cm$^2$ in size. The plate was allowed to stand for 2 days, and then placed in a Bell jar of a vacuum evaporator and kept at 25 cm over a melting crucible. Metallic aluminum was heated and evaporated with an electron beam gun under a vacuum of $3 \times 10^{-5}$ Torr and vacuum coating was carried out for about 30 sec. The thus-obtained polycarbonate mirror was, without remove from the Bell jar, subjected to vacuum coating with quartz for about 4 min., while the degree of vacuum inside the Bell jar was kept at $8 \times 10^{-5}$ Torr. The resulting resin reflector having a surface protective layer had a high light reflectivity with a smooth surface, one of the mirrors was immediately removed, immersed in city water and the surface film stripped partially in the water. Using the city water test after standing at room temperature for one day, the stripping of the mirror film occurred in 2 hrs. The mirror kept several days after preparation did not show peeling of the mirror film in the water at all.

EXAMPLE 2

A glass mold was prepared by spacing and sealing the surrounding of a couple of glass hemispherical plates, one 30 cm in inner diameter and 29 cm in outer diameter using a silicone rubber 5 mm thick and 3 cm in width. In this glass mold were placed a mixture of 34.3 g of W, W'-diacryloylpolytetramethylene glycol, 82.2 g of methylmethacrylate, 13.7 g of tribromophenylmethacrylate, 6.9 g of ethylene glycol dimethacrylate, 1 g of benzoyl peroxide and 0.5 g of dimethylaniline, and it was allowed to stand about one day at room temperature. Then, heating was conducted at 100° C. for 2 hrs and further at 150° C. for 30 min. and a resin shade having a good luster on the surface was formed.

The above resin shade was placed in the same vacuum Bell jar as in Example 1 and kept 30 cm from the top of the shade to the heating boat and subjected to vacuum deposition of aluminum under $10^{-5}$ Torr for about 5 sec. with the use of a resistance heating boat, and successively silicon dioxide was vacuum deposited under a vacuum of $5 \times 10^{-5}$ Torr with the use of an electron beam gun and a crucible for about 5 min. The surface of the thus obtained resin reflecting shade was rubbed with a finger nail on that date, and the surface film was damaged and the resin surface was exposed. After allowing the shade to stand for one day, the same testing of the surface did not give rise to any damage or exposure of the resin base. The pencil hardness of the surface was between HB and H. The reflectivity of this resin shade was quite excellent and even by lighting the lamp, no characteristic change of the shade was observed.

EXAMPLE 3

A self fire-extinguishing polycarbonate plate of 2 mm thickness, a surface roughness less than 0.1 micron, and $20 \times 20$ cm$^2$ in size was placed in a Bell jar of a vacuum evaporator, and the plate was kept at 30 cm over a melting crucible. Gunmetal was heated and evaporated under a vacuum of $6 \times 10^{-5}$ Torr with an electron beam gun at a voltage of 2 kV and an output power of 4 kW and vacuum coating was conducted for one min. The thus obtained gunmetal reflector was subjected, without being removed from the Bell jar but with oxygen being passed into the Bell jar, for 5 min of vacuum deposition by heating and evaporating alumina with an electron beam gun at a voltage of 0.2 kV and an output power of 1.5 kW under a vacuum of $5 \times 10^{-4}$ Torr. The resultant resin reflector having a protective alumina film was allowed to stand for 3 days at room temperature, and on immersion testing in city water gave no turbidity or peeling-off phenomenon at all even after one week.

EXAMPLE 4

A self flame-extinguishing polycarbonate plate of 2 mm thickness, a surface roughness less than 0.1 micron, and $20 \times 20$ cm$^2$ in size prepared as described in Example 3 was placed in a Bell jar of a vacuum evaporator and kept at 30 cm over a melting crucible. Nitrogen gas was introduced under a vacuum of $3 \times 10^{-5}$ Torr and metallic titanium was heated and evaporated with an electron beam gun at a voltage of 1 kV and a current of 1.5 mA, at room temperature, under a vacuum of $2 \times 10^{-3}$ Torr and a reactive ion plating was conducted for 5 min to obtain a golden-colored titanium nitride reflector. Without removing the reflector obtained from the Bell jar, the nitrogen was replaced with oxygen under a vacuum of $3 \times 10^{-5}$ Torr; then the pressure was raised to $5 \times 10^{-3}$ Torr and again reduced to $3 \times 10^{-5}$ Torr. After the same procedure was repeated 3 times, the degree of vacuum was maintained at $5 \times 10^{-4}$ Torr, under conditions of an electron beam gun output power of 0.8 kW at a cathode voltage of 0.2 kV and a current of 0.3 to 3.4 mA, vacuum coating of quartz was conducted for 3 min onto the resin plate at room temperature in an oxygen atmosphere. The thus obtained surface protective layer had a sufficient hardness such as a Mohs's hardness of 2.

What is claimed is:

1. A reflector comprising a light-reflecting metallic film vacuum coated on one or more sides of a molded body of polymeric material or a composite thereof, with the surface of said body formed of a thermosetting resin devoid of volatile components, and a light-transmissible crystalline film of an inorganic material selected from the group consisting of a metal oxide, an oxide of an amphoteric element and a mixture thereof vacuum coated on said light-reflecting metallic film.

2. The reflector as set forth in claim 1, in which said polymeric material is selected from the group consisting of a volatile matter-free thermosetting resin and a mixture thereof, with one or more of a reinforcing filler, a flame retardant and a self fire-extinguishing agent, which are free of volatile components under a vacuum.

3. The reflector as set forth in claim 2, wherein said thermosetting resin is a polycarbonate resin, a polyester resin, a phenol resin, a urea resin, a furfural resin, an allyl resin, an epoxy resin, a silicone resin, a borosilicone resin and a carbosilicone resin; and said reinforcing filler is glass fiber, mica, or asbestos.

4. The reflector as set forth in claim 1, in which said light-reflecting metallic film is a film of a colorless light-reflecting metal selected from the group consisting of aluminum, silver, chromium, nickel, platinum and alloys thereof; a colored light-reflective metal or metallic compound selected from the group consisting of copper, gold, alloys thereof and nitrides thereof, brass, and nitrides of titanium.

5. The reflector as set forth in claim 1, in which said metal oxide is a crystallized quartz; a metal oxide ceramic selected from the group consisting of magnesia, alumina, and zirconia; spinel; a cordierite ceramic; or a lithia ceramic.

6. The reflector as set forth in claim 1, wherein the thickness of the light-reflecting metal film is several thousand Angstroms to 1 micron and the thickness of the light-transmissible film is several thousand Angstroms to 4 microns.

* * * * *